Oct. 6, 1959 — E. S. GRAHAM — 2,907,124
SLUDGE BED CLEANER
Filed July 22, 1957 — 4 Sheets-Sheet 1

INVENTOR.
Edward S. Graham,
BY
Beau, Brooks, Buckley & Beau
ATTORNEYS.

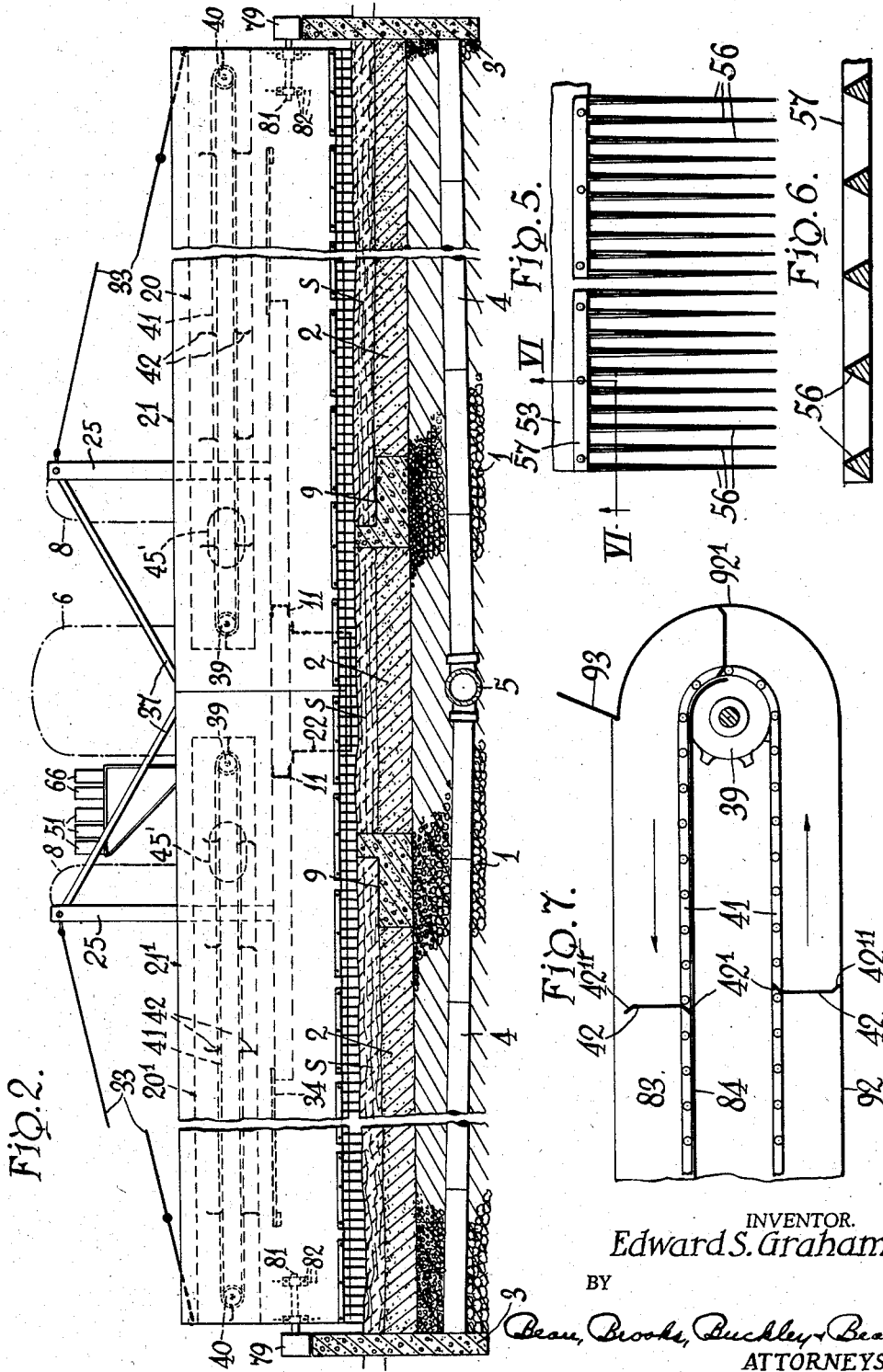

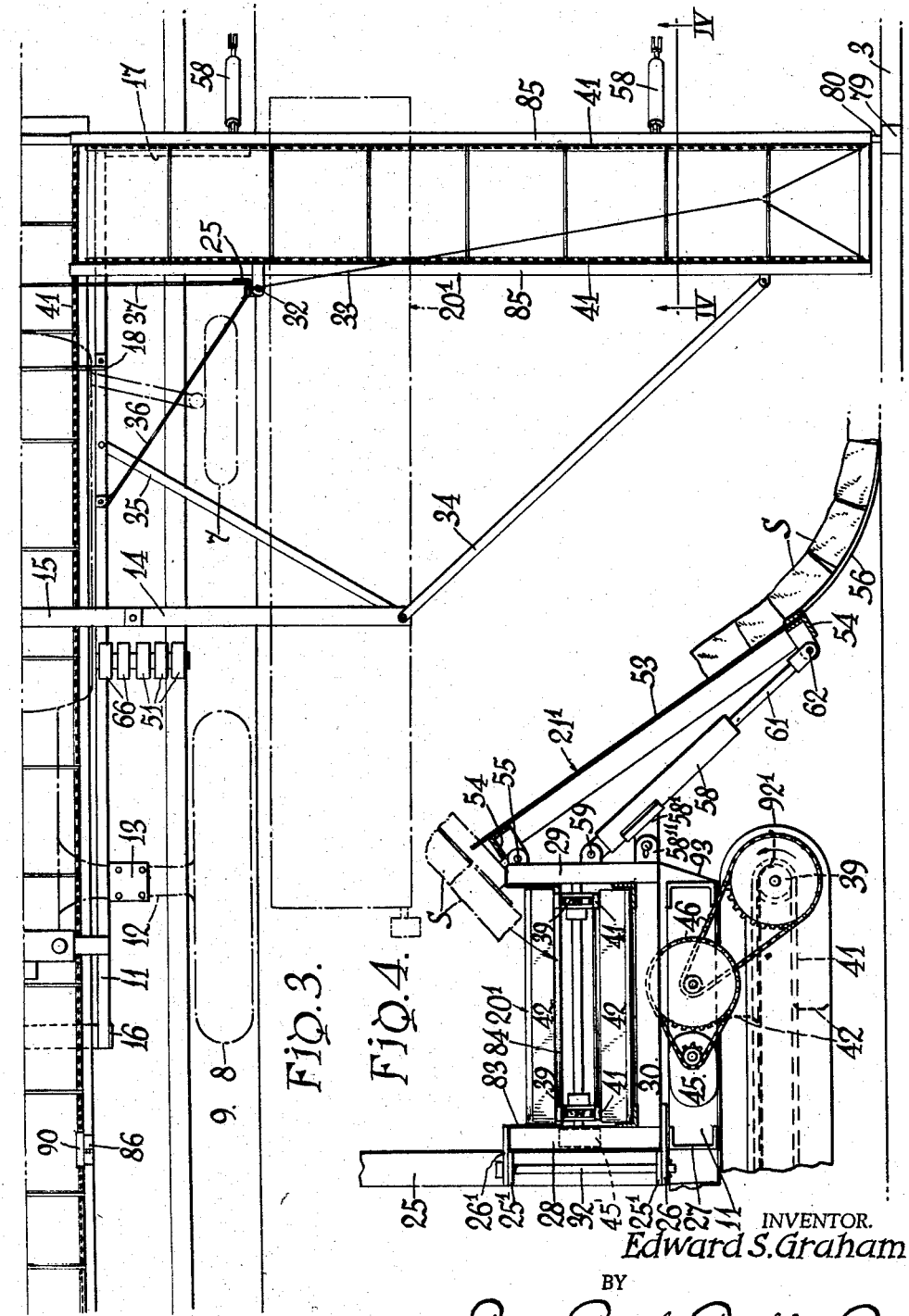

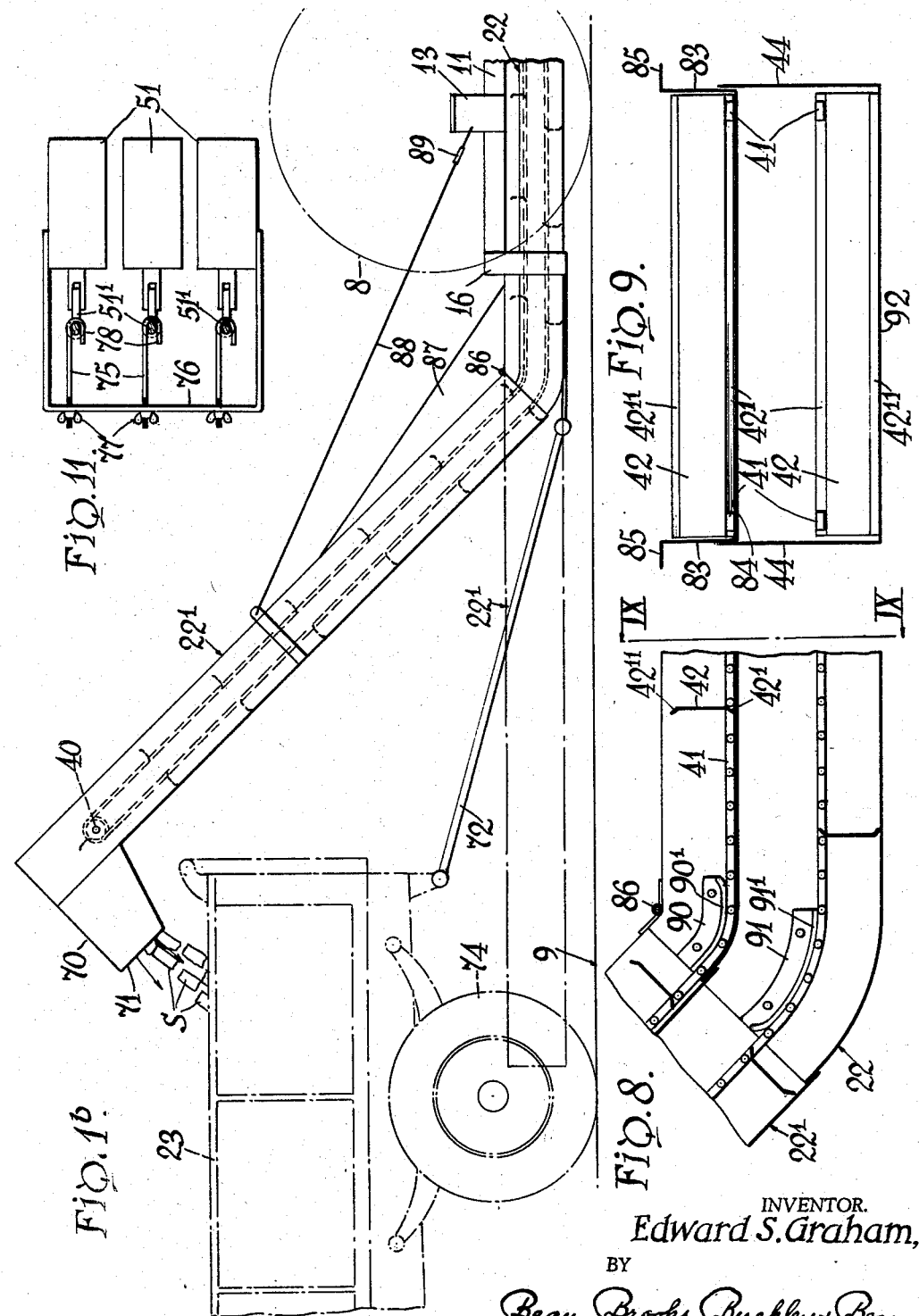

United States Patent Office 2,907,124  
Patented Oct. 6, 1959

2,907,124

SLUDGE BED CLEANER

Edward S. Graham, East Aurora, N.Y.

Application July 22, 1957, Serial No. 673,272

18 Claims. (Cl. 37—8)

This invention relates generally to the sewage disposal art, and more specifically to a new and useful machine for removing dried sludge from dewatering beds.

It is customary to chemically treat sewage in digester tanks, and then to run the effluent from such tanks onto a dewatering bed for the purpose of removing water therefrom. This drying process takes several days, following which it is necessary to remove the dried sludge from the bed for ultimate disposition.

Dried sludge readily pulverizes and pulverized sludge fouls the filter sand in the dewatering bed, causing the same to loose its filtering properties. This is extremely undesirable, because such sand then must be replaced, which is quite expensive. Therefore, it is essential that the dried sludge be handled with great care. Heretofore, no machine of which I am aware has been suitable for this purpose and it has been necessary to remove dried sludge from such beds entirely by hand operation.

Hand removal of dried sludge is extremely time consuming, thereby delaying the availability of a bed for the succeeding charge of effluent to be dewatered. In view of the rapidly increasing population, already placing a great strain on existing sewage disposal facilities, the problem of quickly and properly removing dried sludge in order to increase the capacity of available dewatering beds is assuming critical proportions, being complicated by the ever increasing cost of labor coupled with the difficulty of obtaining and maintaining a satisfactory labor force for this type of work.

Accordingly, it is a primary object of my invention to provide a machine which so nearly duplicates the removal of dried sludge by hand operation as to be eminently suitable for stripping sludge from dewatering beds.

Another object of my invention is to provide such a machine in a construction which will enable machine cleaning of almost an entire bed, leaving only a very small portion to be removed by hand.

Another object of my invention is to provide the foregoing in a machine which is adapted for attachment to a conventional tractor, for being transported thereby.

Still another object of my invention is to provide a sludge bed cleaning machine adapted for operation by only one man, whereby much more rapid cleaning can be accomplished with a greatly reduced labor force, as compared to manual operation.

Still another object of my invention is to provide the foregoing in a machine which is of a relatively simple and inexpensive construction, and which is extremely durable and dependable in operation.

A sludge bed cleaning machine constructed in accord with my invention is characterized in one aspect thereof by the provision of a framework adapted for attachment to vehicular means for moving the same along a dewatering bed, opposed cross conveyors carried by said framework in substantially transverse alignment, a discharge conveyor extending generally lengthwise of said framework from a point in alignment with the adjacent ends of the cross conveyors to a point of discharge into a receiver, together with sludge stripping and lifting means carried by said framework forwardly of the cross conveyors, and drive means for moving the conveyors and for selectively lowering and lifting the stripping means to strip a load of sludge from the bed and then lift the same upwardly onto the cross conveyors for transfer thereby onto the discharge conveyor.

A sludge bed cleaning machine constructed in accord with my invention also is characterized, in other aspects thereof, by the provision of an especially designed stripping means, conveyor drive means of special form, and other distinguishing features.

The foregoing and other objects, advantages and characterizing features of a sludge bed cleaner constructed in accord with my invention will become clearly apparent from the ensuing detailed description of a presently preferred embodiment thereof, considered in conjunction with the accompanying drawings illustrating such embodiment and forming a part hereof wherein like reference numerals denote like parts throughout the various views and wherein:

Fig. 1b is a side elevational view of the rear portion thereof, Figs. 1a and 1b overlapping and together showing the complete machine in side elevation, Fig. 1b also illustrating in phantom a receiver for sludge discharged by my machine;

Fig. 2 is a front elevational view thereof, in operation on a typical dewatering bed shown in transverse section;

Fig. 3 is a fragmentary top plan view thereof;

Fig. 4 is a sectional view, taken about on line IV—IV of Fig. 3, showing certain details of a cross conveyor and stripping member;

Fig. 5 is a fragmentary plan view of the tines on the stripping member;

Fig. 6 is a fragmentary sectional view thereof taken about on line VI—VI of Fig. 5;

Fig. 7 is a longitudinal sectional view of the front end portion of the discharge conveyor;

Fig. 8 is a similar view of an intermediate portion thereof;

Fig. 9 is a transverse sectional view thereof, taken about on line IX—IX of Fig. 8;

Fig. 11 is a schematic view of a portion thereof, showing the adjustable throttling means therefor.

Figure 10:
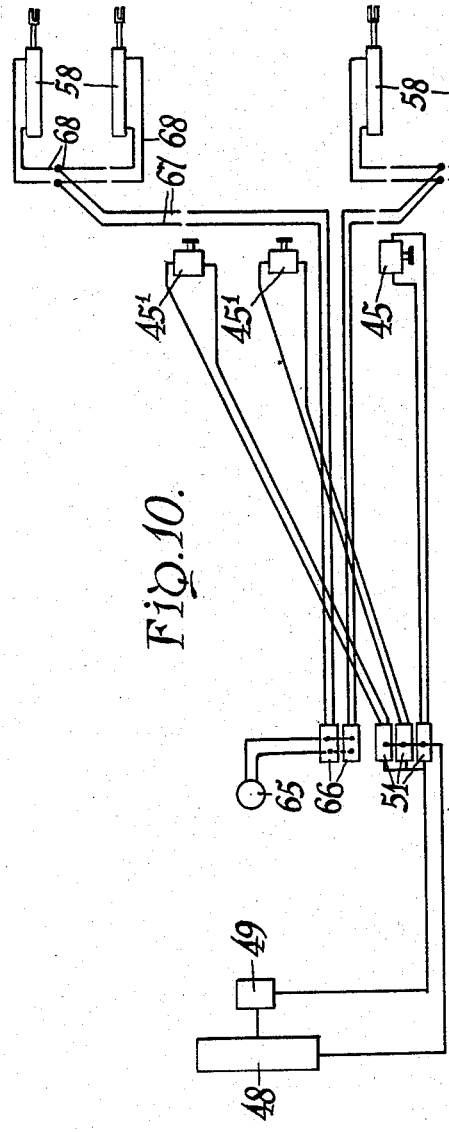
Fig. 10 is a schematic showing of the hydraulic drive system used in my machine.

A typical dewatering bed, which my machine is adapted to clean, is shown in Fig. 2 to comprise stone or other aggregate 1 of graduated size supporting relatively fine filter sand 2 on which the sludge S is dried. The bed is defined by opposite side walls 3, and is provided with cross tiles 4 inclining downwardly to a longitudinally extending central drain tile 5.

As previously noted, the digested effluent is run onto the sand 2 to be dried, the water therefrom filtering through the sand 2 and stone 1, into and through the tiles 4 and 5, respectively. When the sludge has dried, which takes from ten days to two weeks, or longer, depending on the weather, it is necessary to remove it from the bed and thus free the bed for a fresh charge of digested sludge to be dewatered.

In the illustrated embodiment, the machine of my invention is adapted to be mounted on a vehicle 6 such as a tractor of conventional form having front and rear wheels 7 and 8 adapted to run on tracks 9 extending lengthwise of the dewatering bed. The tracks 9 support the weight of the tractor and attached machine and can readily be built into existing beds to adapt them for machine cleaning.

My machine comprises a framework adapted to be attached to the tractor 6 and includes, for example, longitudinally extending side channel members 11 secured to the tractor rear axle housing 12, as by an angle bracket 13, and secured intermediate their ends to laterally projecting angle members 14 in turn suspended from the tractor body as by a cross strap 15.

At their rear ends, side channels 11 are joined by a cross strap 16, and at their forward ends they are interconnected by a cross channel 17. Side channels 11 also are joined to each other and to the tractor 6 by a front plate 18.

My machine further comprises first and second cross conveyors 20 and 20' arranged in opposed, transverse alignment, corresponding first and second stripping and lifting members 21 and 21' carried thereby, and a discharge conveyor 22 extending longitudinally of the machine from a point adjacent the inner ends of cross conveyors 20 and 20' rearwardly to a point of discharge into a dump truck, indicated in phantom at 23, or other receiver.

Cross conveyors 20 and 20' are identical in construction, except that the movable conveyors thereof are driven in opposite directions relative to each other, whereby only one thereof will be described in detail. Each conveyor is pivotally mounted on an upright support 25 welded or otherwise secured to lateral channel 27 in turn connected to a side channel 11, and comprises a framework having sides defined by upright angle members 28 and 29 joined by cross members 30 providing a bottom. Conveyors 20 and 20' are pivoted adjacent their inner ends on uprights 25 as by plates 26 and 26' apertured in line with ears 25' on post 25 to receive a connecting pin 32. Thus, each cross conveyor 20, 20' is arranged to pivot about the axis of pin 32 to a stowed, inoperative position extending generally longitudinally of the machine, as indicated in broken lines in Fig. 3, and when in this position rests on an angle 14. In use, conveyors 20 and 20' project laterally outwardly, as illustrated in full lines in Fig. 3, being releasably held in this position by means of guy wires 33, connected to posts 25, and removable brace rods 34 extending between the outer ends of angles 14 and the outer end portions of the cross conveyors. Angles 14, which are secured at their inner ends to side channels 11, can be further supported by braces 35 extending between the outer ends thereof and side channels 11, and uprights 25 are further supported by rearwardly extending braces 36 connected to side channels 11 and by cross braces 37.

Each cross conveyor comprises an open flight conveyor, having for example spaced driving sprockets 39 at the inner ends thereof and idling sprockets 40 at the outer ends thereof, the sprockets being carried on shafts journaled in the side wall members 28 and 29, with side chains 41 trained around said sprockets 39 and 40. Side chains 41 are crossed at spaced points therealong by cross bars 42 which are joined to chains 41 in a manner known in the art.

Similarly, discharge conveyor 22 comprises spaced drive sprockets 39 and idling sprockets 40, adjacent the opposite ends thereof, the sprockets 39 and 40 being joined by opposite side chains 41 carrying cross bars 42. Discharge conveyor 22 is enclosed within a housing, to be described hereafter, and is connected to the supporting framework at spaced points as by the cross strap 16 which engages therebeneath and the front plate 18.

In accord with my invention, the three conveyors 20, 20' and 22 are driven by hydraulic motors, comprising for example three-horse power, five gallon per minute motors made by the Hydraulic Division of New York Air Brake Company, indicated schematically in Fig. 10 as comprising a first motor 45 for driving discharge conveyor 22, and like motors 45' for driving the two cross conveyors 20 and 20'. The motors 45 and 45', which are driven at high speed to provide the necessary power, have a double reduction gear drive connection to their respective conveyors, as indicated at 46 in Fig. 4, with discharge conveyor 22 being driven faster than conveyors 20 and 20' to handle the material received therefrom. The motors 45 and 45' are supplied with hydraulic fluid under pressure from a reservoir 48, such as for example a ten-gallon tank, by a hydraulic pump 49 comprising for example a 25 gallon per minute pump of the aforesaid manufacture, with motor 45 being supplied first.

The admission of hydraulic fluid to the motors 45 and 45' is controlled by valve units 51 of known construction having adjustable throttles 51' (Fig. 11) for selectively controlling the speed of said motors.

The stripping and lift members 21 and 21' also are identical in construction, whereby only one will be described in detail, and are designed to strip the sludge S from the bed. Each member 21, 21' comprises in the illustrated embodiment a metal slide plate 53 galvanized to avoid chemical reaction with the sludge and reinforced adjacent its front and rear edges as by angle members 54, each slide plate 53 being of a width extending from the outer reach of its associated cross conveyor to approximately the longitudinal center line of the machine as clearly illustrated in Fig. 2. Each slide plate 53 is pivoted adjacent its rear edge on the forward side wall of its associated cross conveyor, as indicated at 55 (Fig. 4), being arranged so that the rear edge of each slide plate overhangs the associated cross conveyor when the stripping member is lifted as to its broken line position in Fig. 4.

To engage beneath the sludge S and peel the same from the dewatering bed, each slide plate is provided along its forward edge with tines 56 projecting therefrom, comprising for example sets of tines joined to base plates 57 which in turn are secured to the slide plates 53. The stripping members 21 and 21' are selectively raised and lowered by means of motors in the form of hydraulic cylinders 58 pivotally connected adjacent one end, as at 59, to the upright angle members 29 on the cross conveyors 20 and 20', and having piston rods 61 projecting therefrom and pivotally connected, as at 62, to the forward reinforcing angles 54 on slide plates 53.

In order to lift the dried sludge without breaking the same into small particles, it is essential that the stripping member operate smoothly in a manner closely resembling human operation, and to this end I have determined that a hydraulically powered actuating system is necessary. Therefore, I provide the reversible hydraulic cylinders 58, there being at least two cylinders 58 for each stripping member 21, 21' (Fig. 3), being positioned on opposite sides of the center thereof. Cylinders 58 are supplied with hydraulic fluid under pressure from any suitable source such as for example the hydraulic power take-off 65 customarily provided on modern tractors, the supply of hydraulic fluid to opposite ends of cylinders 58 being selectively regulated by control units 66 of known form. In addition, in order to insure that the outermost of the cylinders 58 receives preference over the other cylinder 58 for each stripping member as to hydraulic fluid, if either cylinder is to receive preference, the supply conduits 67 are a surrounding housing for the return flight, in order to avoid fouling of the filter sand 2 by material remaining on the conveyor. This is conveniently provided by a generally U-shaped, channel-like member having opposite side walls 44 of the housing and a bottom wall 92, with the upper edge 42" of the cross bars 42 of conveyor 22 being forwardly and upwardly inclined so that on the return flight they will scrape along the bottom wall 92 and return any sludge particles thereon. At its inner end, adjacent the cross conveyors 20 and 20', the bottom wall 92 is curved around as indicated at 92' to overlap the bottom wall 84 of the conveying flight thereof, whereby any sludge particles which are returned are brought again to the conveying flight for eventually being discharged thereby into the receiver 23. Further, the bottom wall part 92' preferably terminates in an upwardly and forwardly extending baffle 93, to assist in preventing the accidental discharge of sludge particles from the cross conveyors 20 and 20' down onto the filter sand 2 by directing the same onto the discharge conveyor 22.

Accordingly, it is seen that the sludge bed cleaning machine of my invention fully accomplishes the aforesaid objects. Experimental testing has established that it is highly suitable for the intended purpose, cleaning as much as ninety-eight percent of the bed with only the edges requiring cleaning by hand. In one installation, where it formerly took four men two days to clean a bed by hand, I have found that with my machine it takes two men only one hour, whereby the beds can be made aavilable for reuse much sooner than heretofore, with a reduced labor force. In addition, my machine will handle sludge when it is not completely dry and is too heavy to be manually removed, thereby reducing the length of use of the bed by a particular charge of effluent. When the bed is clean, it can be given a final raking by my machine, in one pass, and is ready for reuse.

While only a presently preferred, illustrative embodiment is discussed in detail herein, I do not intend that my invention necessarily be limited thereto. I am aware that modifications and variations will occur to those skilled in the art, without departing from the spirit of my invention or the scope of the appended claims.

Having completely disclosed and described my invention and its mode of operation, what I claim as new is:

1. A machine for removing sludge from a dewatering bed comprising, a framework adapted to be moved along a bed, first and second cross conveyor means carried by said framework in generally transverse alinement relative thereto, discharge conveyor means carried by said framework to extend lengthwise thereof with one end portion of said discharge conveyor means being positioned in alinement with the adjacent end portions of said first and second cross conveyor means, means driving said first and second cross conveyor means in opposite directions relative to each other with the conveying flights thereof moving toward said discharge conveyor means, means driving said discharge conveyor means with the conveying flight thereof moving away from said one end portion thereof, first and second stripping means carried by said framework ahead of said first and second cross conveyor means, said first and second stripping means each being of a width spanning substantially the entire reach of the associated one of said first and second cross conveyor means and having means for engaging a bed beneath the sludge thereon to strip the latter therefrom upon forward movement of the machine, means pivotally supporting each of said first and second stripping means for movement relative to said first and second cross conveyor means about an axis extending generally lengthwise thereof, means for selectively lowering said first and second stripping means about the pivot axis thereof to penetrate into a bed beneath the sludge thereon, and means for selectively lifting said first and second stripping means about the pivot axis thereof to transfer a load of sludge thereon to said first and second cross conveyor means for transfer thereby to discharge conveyor means.

2. A sludge bed cleaning machine as set forth in claim 1, wherein each of said first and second stripping means comprises substantially smooth slide plate means having closely spaced elongated tines projecting forwardly therefrom for penetrating a bed to strip the sludge when said stripping means is lowered, said plate means being of a length to overhang the associated cross conveyor means when said stripping means is lifted to transfer sludge thereto.

3. A sludge bed cleaning machine as set forth in claim 2, wherein said tines taper forwardly and are concavely curved lengthwise thereof to dig into a bed under the sludge thereon and thereby strip the same therefrom with the stripped sludge moving rearwardly along said tines and onto said plate means upon forward movement of said machine, and said tines being of substantially upright generally triangular cross sectional form to minimize clinging of filter sand thereto.

4. A machine for removing sludge from a dewatering bed comprising, a framework adapted to be moved along a bed, first and second cross conveyor means carried by said framework in generally transverse alinement relative thereto, discharge conveyor means carried by said framework to extend lengthwise thereof with one end portion of said discharge conveyor means being positioned in alinement with the adjacent end portions of said first and second cross conveyor means, means driving said first and second cross conveyor means in opposite directions relative to each other with the conveying flights thereof moving toward said discharge conveyor means, means driving said discharge conveyor means with the conveying flight thereof moving away from said one end portion thereof, first and second stripping means carried by said framework ahead of said first and second cross conveyor means, said first and second stripping means each being of a width spanning substantially the entire reach of the associated one of said first and second cross conveyor means and having means for engaging a bed beneath the sludge thereon to strip the latter therefrom upon forward movement of the machine, means pivotally supporting each of said first and second stripping means for movement relative to said first and second cross conveyor means about an axis extending generally lengthwise thereof, means for selectively lowering said first and second stripping means about the pivot axis thereof to penetrate into a bed beneath the sludge thereon, and means for selectively lifting said first and second stripping means about the pivot axis thereof to transfer a load of sludge thereon to said first and second cross conveyor means for transfer thereby to said discharge conveyor means, wherein said cross and discharge conveyor drive means comprise hydraulic motor means and means for supplying hydraulic fluid thereto under pressure, together with motor control means for selectively independently varying the speed of said motor means.

5. A sludge bed cleaner as set forth in claim 4, wherein said motor means are arranged so that the motor driving said discharge conveyor means receives pressurized hydraulic fluid in preference to the motor means for said first and second cross conveyor means.

6. A sludge bed cleaner as set forth in claim 4, wherein said motor control means include independently adjustable throttle means, together with adjustable stop means for holding said throttle means in any one of a number of predetermined open positions, said stop means being arranged to avoid interference with movement of said throttle means to wider open position for quickly increasing the driving force on any of said conveyor means.

7. A machine for removing sludge from a dewatering bed comprising, a framework adapted to be moved along a bed, first and second cross conveyor means carried by said framework in generally transverse alinement relative thereto, discharge conveyor means carried by said frame-connected to the conduits 68 leading to the different cylinders 58 at a point at least midway between them and preferably slightly laterally outwardly from the midpoint therebetween.

Thus, upon actuating control units 66 in one direction the stripping members 21, 21' are lowered by cylinders 58, with the tines 56 digging into the sand 2 below the surface of the sludge S. Members 21 and 21' are lowered by positive action of cylinders 58, to drive tines 56 into sand 2, and when the vehicle is moved forwardly the tines 56 engage beneath the slude S and strip the same from the surface of the sand 2, with the sludge breaking apart in large chunks and sliding rearwardly on tines 56 and up on slide plate 53, in the manner illustrated in Fig. 4, all without pulverizing. Then the hydraulic control units 66 are actuated to cause cylinders 58 to lift the members 21 and 21', as to the position thereof shown in broken lines in Figs. 1a and 4, causing the stripped sludge to slide rearwardly along the slide plates 53 and onto the cross conveyors 20 and 20'. The sludge then is carried by the cross bars 42 of the cross conveyors 20 and 20', moving inwardly toward the centrally positioned discharge conveyor 22. At the inner end, the sludge is dropped off the cross conveyors 20 and 20' onto the rearwardly moving conveying flight of discharge conveyor 22, by which it is conveyed to the discharge point, at which it drops off conveyor 22 into the waiting receiver 23.

To direct the discharged sludge into receiver 23, I preferably provide a hood 70, directed downwardly and open at its outer end 71, whereby the sludge from the moving discharge conveyor is confined and directed by the hood 70 to discharge neatly into the receiver, without fouling the bed therearound. For purposes of convenience, receiver 23 can be hitched to my machine as by a hitch bar 72 and can have wheels 74 adapted to ride in the tracks 9, thereby requiring actually only one attendant, to wit, the person driving the tractor 6.

In addition to the general organization, there are certain more detailed aspects of a sludge bed cleaning machine of my invention which I consider to be of considerable importance.

Figure 1A:
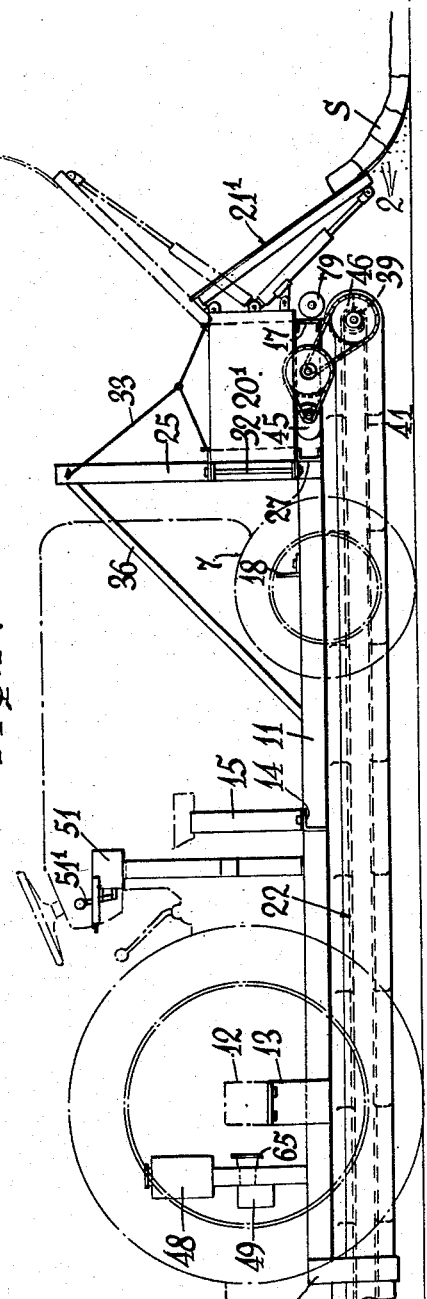
Fig. 1a is a side elevational view of the forward portion of a sludge bed cleaning machine constructed in accord with my invention, showing the same mounted on a vehicle illustrated in phantom.

For example, the lifting members are especially designed to strip the dried sludge S from the bed, without pulverizing the same, and to this end the tines 56 are of slightly concave curvature in lengthwise extent, and taper forwardly substantially to a point relative to the base 57, whereby the tines 56 will enter the sand 2 beneath the sludge and smoothly strip the same therefrom, with the tines 56 and slide plates 53 presenting a substantially smooth and continuous surface from the tips of the tines to the rear edge of the slide plates. To properly engage and carry the sludge, the tines are elongated and relatively closely spaced, as for example about twenty-one inches long and about one inch apart. Furthermore, tines 56 preferably are of triangular cross sectional form as illustrated in Fig. 6, with the triangles being pointed generally upwardly whereby as the tines 56 are lifted from the sand 2 the latter will readily fall therefrom as indicated in Fig. 1a, minimizing the amount of sand 2 carried by tines 56 with the sludge S and discharged thereby onto the cross conveyors 20 and 20'. The tines alined with tracks 9 can be shortened to avoid interference therewith.

Also, as previously noted, I use a hydraulic lifting and lowering mechanism to manipulate the stripping members 21 and 21', which I consider to be of particular importance because I have found and believe that only a hydraulic mechanism can sufficiently duplicate the smoothness of manual operation, to enable satisfactory machine cleaning.

The stripping members 21 and 21' are lowered with a positive drive, to enter sand 2 to a depth of approximately 2 or 3 inches, and to help hold them in the correct lowered position I provide adjustable stops, such as the saddles 58' adjustable on brackets 58" carried by uprights 29, which bear against the cylinders 58.

In addition, it will be observed that each of cross conveyors 20 and 20' is independently controlled, whereby if one conveyor should become loaded, more than the other, such as to perhaps interfere with its proper operation, the operator can merely move the appropriate throttle 51' to a more open position, speeding up the drive motor for that conveyor to provide the necessary power.

To this end, an adjustable stop is provided for maintaining each of throttles 51' in a preselected partially open position, each such stop comprising for example a J-shaped member 75 (Fig. 11) adjustably positioned on a frame 76 carried by the valve housings 51, as by wing nut 77, whereby each throttle 51 can be held in a variable, preselected open position. If it should be desired to suddenly increase the hydraulic power supplied to any one of conveyors 20, 20' and 22, the appropriate throttle 51' is simply moved to wide open position, the hook portion 78 of each member 75 being open in the direction of such movement of the throttle member 51 to avoid interference therewith.

Appropriate safety valves can be provided, to avoid damage to the hydraulic system.

In addition, to assist in supporting the laterally projecting cross conveyors 20 and 20' I provide a roller 79 at the outer end thereof for bearing on side walls 3. Rollers 79 are adjustably mounted, as by shafts 80 connected to spaced brackets 81, on cross channel 17 (Fig. 2) in a manner permitting vertical adjustment thereof as to any of a number of different positions as indicated for example by the openings 82.

When the conveyors 20 and 20' are empty I contemplate that the rollers 79 will clear side walls 3, but when said conveyors are loaded the rollers will bear against the walls to assist in supporting the same.

Further along this line, in order to avoid fouling of the conveyor mechanism by the sludge being carried thereby, which often will pulverize on the conveyor, I provide the conveying flight of each conveyor with a housing having side and bottom walls 83 and 84, respectively, (Fig. 9) this being perhaps most conveniently provided by a generally channel shaped sheet metal member having its upper side edges terminating in laterally outwardly directed flanges 85. In the cross conveyors 20, 20' the flanges 85 rest on the side wall uprights 28 and 29. Such an arrangement is of importance because it retains all of the pulverized sludge on the conveyors, preventing the same from fouling the conveyor mechanism below the conveying flights and from falling through the conveyors and fouling the filter sand 2.

In addition, the cross bars 42 are designed so that the bottom edge portion 42' thereof is inclined forwardly and downwardly, comprising a scraper blade designed to scrape over the bottom 84 of the surrounding housing for moving sludge residue therealong and, in the case of the cross conveyors 20 and 20', transferring the same to the discharge conveyor 22.

The discharge conveyor is provided with a rear section 22' preferably hinged thereto as at 86 for being lowered into alignment with the main section 22, as indicated in phantom in Fig. 1b. The section 22' is held in its raised position by guy wires 88, which can have a turnbuckle as shown at 89 for selectively adjusting the length thereof, whereby the same can be raised and lowered as desired. In addition, gusset plates 87 are provided on opposite sides of the discharge conveyor along the top thereof at the juncture of sections 22 and 22' to prevent sludge from spilling over.

Furthermore, at the hinge axis there are provided curved shoe members 90 and 91 having shoes 90' and 91', respectively, on which the slide chains 41 slide in making the corner.

In the case of the discharge conveyor, I also provide work to extend lengthwise thereof with one end portion of said discharge conveyor means being positioned in alinement with the adjacent end portions of said first and second cross conveyor means, means driving said first and second cross conveyor means in opposite directions relative to each other with the conveying flights thereof moving toward said discharge conveyor means, means driving said discharge conveyor means with the conveying flight thereof moving away from said one end portion thereof, first and second stripping means carried by said framework ahead of said first and second cross conveyor means, said first and second stripping means each being of a width spanning substantially the entire reach of the associated one of said first and second cross conveyor means and having means for engaging a bed beneath the sludge thereon to strip the latter therefrom upon forward movement of the machine, means pivotally supporting each of said first and second stripping means for movement relative to said first and second cross conveyor means about an axis extending generally lengthwise thereof, means for selectively lowering said first and second stripping means about the pivot axis thereof to penetrate into a bed beneath the sludge thereon, and means for selectively lifting said first and second stripping means about the pivot axis thereof to transfer a load of sludge thereon to said first and second cross conveyor means for transfer thereby to said discharge conveyor means, wherein each of said first and second stripping means comprises substantially smooth slide plate means having closely spaced elongated tines projecting forwardly therefrom for penetrating a bed to strip the sludge when said stripping means is lowered, said plate means being of a length to overhang the associated cross conveyor means when said stripping means is lifted to transfer sludge thereto, and wherein said means for selectively lowering and lifting said stripping means comprise reversible hydraulic cylinder means and means for selectively supplying hydraulic fluid thereto under pressure to drive the same in opposite directions.

8. A sludge bed cleaning machine as set forth in claim 7, there being at least two cylinders for driving each of said first and second stripping means with at least one cylinder on each side of the center of each of said first and second stripping means, and wherein said means for supplying hydraulic fluid thereto under pressure are arranged so that the cylinders most remote from the center of said machine receive preference.

9. A machine for removing sludge from a dewatering bed comprising, a framework adapted to be moved along a bed, first and second cross conveyor means carried by said framework in generally transverse alinement relative thereto, discharge conveyor means carried by said framework to extend lengthwise thereof with one end portion of said discharge conveyor means being positioned in alinement with the adjacent end portions of said first and second cross conveyor means, means driving said first and second cross conveyor means in opposite directions relative to each other with the conveying flights thereof moving toward said discharge conveyor means, means driving said discharge conveyor means with the conveying flight thereof moving away from said one end portion thereof, first and second stripping means carried by said framework ahead of said first and second cross conveyor means, said first and second stripping means each being of a width spanning substantially the entire reach of the associated one of said first and second cross conveyor means and having means for engaging a bed beneath the sludge thereon to strip the latter therefrom upon forward movement of the machine, means pivotally supporting each of said first and second stripping means for movement relative to said first and second cross conveyor means about an axis extending generally lengthwise thereof, means for selectively lowering said first and second stripping means about the pivot axis thereof to penetrate into a bed beneath the sludge thereon, and means for selectively lifting said first and second stripping means about the pivot axis thereof to transfer a load of sludge thereon to said first and second cross conveyor means for transfer thereby to said discharge conveyor means, wherein each of said conveyor means is of open flight form, together with bottom wall means for the conveying flight of each of said conveyor means.

10. A sludge bed cleaning machine as set forth in claim 9, wherein said conveyor means comprise endless chains at opposite sides thereof, with cross bars extending between said chains at spaced points therealong, said cross bars having bottom edge portions inclined forwardly and engaging said bottom wall means.

11. A sludge bed cleaning machine as set forth in claim 9, together with bottom wall means for the return flight of said discharge conveyor means, said discharge conveyor bottom wall means curving around said one end of said discharge conveyor means for scraping contact with the top edge of the cross bars thereof and overhanging the conveying flight bottom wall means thereof, said upper edges of said discharge conveyor cross bars also being forwardly inclined.

12. A machine for removing sludge from a dewatering bed comprising, a framework adapted to be moved along a bed, first and second cross conveyor means carried by said framework in generally transverse alinement relative thereto, discharge conveyor means carried by said framework to extend lengthwise thereof with one end portion of said discharge conveyor means being positioned in alinement with the adjacent end portions of said first and second cross conveyor means, means driving said first and second cross conveyor means in opposite directions relative to each other with the conveying flights thereof moving toward said discharge conveyor means, means driving said discharge conveyor means with the conveying flight thereof moving away from said one end portion thereof, first and second stripping means carried by said framework ahead of said first and second cross conveyor means, said first and second stripping means each being of a width spanning substantially the entire reach of the associated one of said first and second cross conveyor means and having means for engaging a bed beneath the sludge thereon to strip the latter therefrom upon forward movement of the machine, means pivotally supporting each of said first and second stripping means for movement relative to said first and second cross conveyor means about an axis extending generally lengthwise thereof, means for selectively lowering said first and second stripping means about the pivot axis thereof to penetrate into a bed beneath the sludge thereon, and means for selectively lifting said first and second stripping means about the pivot axis thereof to transfer a load of sludge thereon to said first and second cross conveyor means for transfer thereby to said discharge conveyor means, wherein said first and second cross conveyor means are pivoted on said framework for swinging movement into stowed positions in generally longitudinal alinement with said discharge conveyor means.

13. A machine for removing sludge from a dewatering bed comprising, a framework adapted to be moved along a bed, first and second cross conveyor means carried by said framework in generally transverse alinement relative thereto, discharge conveyor means carried by said framework to extend lengthwise thereof with one end portion of said discharge conveyor means being positioned in alinement with the adjacent end portions of said first and second cross conveyor means, means driving said first and second cross conveyor means in opposite directions relative to each other with the conveying flights thereof moving toward said discharge conveyor means, means driving said discharge conveyor means with the conveying flight thereof moving away from said one end portion thereof, first and second stripping means carried by said framework ahead of said first and second cross conveyor means, said first and second stripping means each being of a width spanning substantially the entire reach of the associated one of said first and second cross conveyor means and having means for engaging a bed beneath the sludge thereon to strip the latter therefrom upon forward movement of the machine, means pivotally supporting each of said first and second stripping means for movement relative to said first and second cross conveyor means about an axis extending generally lengthwise thereof, means for selectively lowering said first and second stripping means about the pivot axis thereof to penetrate into a bed beneath the sludge thereon, and means for selectively lifting said first and second stripping means about the pivot axis thereof to transfer a load of sludge thereon to said first and second cross conveyor means for transfer thereby to said discharge conveyor means, together with roller means for engaging a part of the bed and supporting the outer end portions of said first and second cross conveyor means when the latter are loaded, said roller means being vertically adjustable.

14. A machine for removing sludge from a dewatering bed comprising, a framework adapted to be moved along a bed, first and second cross conveyor means carried by said framework in generally transverse alinement relative thereto, discharge conveyor means carried by said framework to extend lengthwise thereof with one end portion of said discharge conveyor means being positioned in alinement with the adjacent end portions of said first and second cross conveyor means, means driving said first and second cross conveyor means in opposite directions relative to each other with the conveying flights thereof moving toward said discharge conveyor means, means driving said discharge conveyor means with the conveying flight thereof moving away from said one end portion thereof, first and second stripping means carried by said framework ahead of said first and second cross conveyor means, said first and second stripping means each being of a width spanning substantially the entire reach of the associated one of said first and second cross conveyor means and having means for engaging a bed beneath the sludge thereon to strip the latter therefrom upon forward movement of the machine, means pivotally supporting each of said first and second stripping means for movement relative to said first and second cross conveyor means about an axis extending generally lengthwise thereof, means for selectively lowering said first and second stripping means about the pivot axis thereof to penetrate into a bed beneath the sludge thereon, and means for selectively lifting said first and second stripping means about the pivot axis thereof to transfer a load of sludge thereon to said first and second cross conveyor means for transfer thereby to said discharge conveyor means, wherein each of said first and second stripping means comprises substantially smooth slide plate means having closely spaced elongated tines projecting forwardly therefrom for penetrating a bed to strip the sludge when said stripping means is lowered, said plate means being of a length to overhang the associated cross conveyor means when said stripping means is lifted to transfer sludge thereto, and wherein said means for selectively lowering and lifting said stripping means comprise reversible hydraulic cylinder means and means for selectively supplying hydraulic fluid thereto under pressure to drive the same in opposite directions, together with adjustable stop means defining a limit to downward movement of said stripping means.

15. A machine for removing sludge from a dewatering bed comprising, a framework adapted to be moved along a bed, cross conveyor means carried by said framework in generally transverse alinement relative thereto, discharge conveyor means carried by said framework to extend lengthwise thereof with one end portion of said discharge conveyor means being positioned in alinement with said cross conveyor means at a point between the opposite ends thereof, means driving the opposite end portions of said cross conveyor means in opposite directions to convey sludge from the opposite ends portions of said cross conveyor means toward said discharge conveyor means, means driving said discharge conveyor means to convey sludge away from said one end portion thereof, stripping means carried by said framework ahead of said cross conveyor means, said stripping means being of a width spanning substantially the entire reach of said cross conveyor means and having means for engaging a bed beneath the sludge thereon to strip the latter therefrom upon forward movement of the machine, means pivotally supporting said stripping means for movement relative to said cross conveyor means about an axis extending generally lengthwise thereof, means for lowering said stripping means about the pivot axis thereof to penetrate into a bed beneath the sludge thereon, and means for lifting said stripping means about the pivot axis thereof to transfer a load of sludge thereon to said cross conveyor means for transfer thereby to said discharge conveyor means.

16. In a machine for removing sludge from a dewatering bed, conveyor means for receiving sludge and transferring the same to a discharge point, and stripping means for removing sludge from a bed and loading it on said conveyor means, said stripping means comprising slide plate means and closely spaced elongated tines projecting forwardly from the forward edge thereof, said tines being of a length several times the spacing between adjacent ones thereof and being adapted to penetrate into a bed beneath the sludge to strip the same from the bed and said slide plate means and said tines together providing a substantially smooth and continuous surface for rearward sliding of stripped sludge thereon, means mounting said stripping means for lowering and lifting movement, and power means for selectively lowering said stripping means with said tines penetrating a bed and lifting said stripping means for rearward sliding of stripped sludge therealong toward said conveyor means, wherein said tines taper forwardly as viewed in plan throughout a major portion including the outer ends thereof and are concavely curved in lengthwise extent substantially throughout the length thereof, said tines being of upwardly tapering form in transverse section.

17. A sludge bed cleaning machine as set forth in claim 16, wherein said power means for lifting and lowering said stripping means comprise selectively reversible hydraulic motors and means for supplying hydraulic fluid thereto under pressure.

18. In a machine for removing sludge from a dewatering bed, a framework adapted to be moved along a bed, conveyor means carried by said framework for receiving sludge and transferring the same to a discharge point, generally vertically movable stripping means carried by said framework for removing sludge from a bed and loading the same on said conveyor means adjacent one end thereof, means for selectively lowering said stripping means to penetrate into a bed beneath the sludge thereon, means for selectively lifting said stripping means to transfer a load of sludge thereon to said conveyor means, said conveyor means comprising an open flight conveyor having cross bars at spaced points therealong, housing means for the conveying flight of said conveyor means including opposite side and bottom wall means, whereby sludge particles are retained by said housing means, the bottom edges of said cross bars being downwardly and forwardly inclined relative to the direction of movement of said conveying flight for scraping contact with said housing bottom wall means, and housing means for the return flight of said conveyor means including opposite side and bottom wall means, the top edges of said cross bars being upwardly and forwardly inclined relative to the direction of movement of said conveying flight for scraping contact with said return flight housing bottom wall means, said return flight housing bottom wall means curving upwardly around said one end of said conveyor means for scraping contact with said cross bar top edges and overhanging said conveying flight bottom wall means.

References Cited in the file of this patent

UNITED STATES PATENTS

| | | |
|---|---|---|
| Re. 2,032 | Sprout | July 18, 1865 |
| 310,810 | Fleming | Jan. 13, 1885 |
| 1,739,624 | Whamond | Dec. 17, 1929 |
| 1,773,446 | Butler | Aug. 19, 1930 |
| 1,825,956 | Huennekens | Oct. 6, 1931 |
| 1,953,100 | Blaisdell | Apr. 3, 1934 |
| 2,041,926 | Herwander | May 26, 1936 |
| 2,366,480 | Beckwith | Jan. 2, 1945 |
| 2,534,886 | Stueland | Dec. 19, 1950 |
| 2,714,459 | Hay | Aug. 2, 1955 |
| 2,740,211 | Henry et al. | Apr. 3, 1956 |

FOREIGN PATENTS

| | | |
|---|---|---|
| 921,560 | Germany | Dec. 20, 1954 |
| 114,387 | Sweden | June 26, 1945 |